United States Patent

[11] 3,618,041

[72] Inventor Hisashi Horikoshi
Tachikawa-shi, Japan
[21] Appl. No. 872,002
[22] Filed Oct. 29, 1969
[45] Patented Nov. 2, 1971
[73] Assignee Hitachi, Ltd.
Tokyo, Japan
[32] Priority Oct. 31, 1968
[33] Japan
[31] 43/79557

[54] MEMORY CONTROL SYSTEM
11 Claims, 9 Drawing Figs.

[52] U.S. Cl. .......... 340/172.5
[51] Int. Cl. .......... G06f 13/00
[50] Field of Search .......... 340/172.5

[56] References Cited

UNITED STATES PATENTS

| | | | |
|---|---|---|---|
| 3,413,613 | 11/1968 | Bahrs et al. .......... | 340/172.5 |
| 3,275,991 | 9/1966 | Schneberger .......... | 340/172.5 |
| 3,292,152 | 12/1966 | Barton .......... | 340/172.5 |
| 3,337,851 | 8/1967 | Dahm .......... | 340/172.5 |
| **Re. 26,624** | 7/1969 | Bloom et al. .......... | 340/172.5 |

*Primary Examiner*—Raulfe B. Zache
*Attorney*—Craig, Antonelli, Stewart & Hill

ABSTRACT: A memory control system for a data processor having a central processing unit, a main memory, a buffer memory operable with a speed several to more than 10 times the speed of the main memory, and a memory control unit for checking whether information at an address is transferred from the main memory and stored in the buffer memory. The memory control unit includes an instruction memory control section and an operand memory control section which can operate independently of each other so as to improve the processing ability of the data processor.

INVENTOR
HISASHI HORIKOSHI
BY
Craig, Antonelli, Stewart & Hill
ATTORNEYS

INVENTOR

HISASHI HORIKOSHI

BY Craig, Antonelli, Stewart & Hill
ATTORNEYS

| CX1 | | CX2 | |
|---|---|---|---|
| SC | BC | SC | BC |
| 1 | 0 | 0 | 0 |
| 1 | 0 | 0 | 1 |
| 1 | 0 | 1 | 0 |
| 0 | 0 | 1 | 0 |
| 0 | 1 | 1 | 0 |

INVENTOR
HISASHI HORIKOSHI
BY Craig, Antonelli, Stewart & Hill
ATTORNEYS

INVENTOR

HISASHI HORIKOSHI

BY

Craig, Antonelli, Stewart & Hill

ATTORNEYS

INVENTOR

HISASHI HORIKOSHI

BY
Craig, Antonelli, Stewart & Hill
ATTORNEYS

INVENTOR

HISASHI HORIKOSHI

BY Craig, Antonelli, Stewart & Hill
ATTORNEYS

MEMORY CONTROL SYSTEM

BACKGROUND OF THE INVENTION

1. Field of the Invention

This invention relates to memory control systems for data processors and more particularly to a memory control system for a buffer memory.

2. Description of the Prior Art

Rapid development in semiconductor circuit techniques in recent years has led to a remarkable increase in the operation speed of central processing units in electronic computers and the like and, as a result, a large gap has resulted between the operation speed of the central processing unit and the access time of a large capacity memory. In an attempt to overcome such a large gap, methods which employ a buffer memory of small capacity capable of a high-speed access for improving the equivalent access time of the whole memory were proposed by D.H. Gibson in Consideration in Block-Oriented Systems Design; S.J.C.C., 1967 and by C.J. Conti et al. in Structural Aspects of the System /360 Model 85; IBM System Journal, 1968, and were proved quite effective.

According to the above methods, a digital computer comprises a central processing unit, a main memory unit, a buffer memory unit having an operating speed several to more than 10 times that of the main memory unit, and a memory control unit for checking whether information at an address in the main memory unit is transferred to and stored in the buffer memory unit. The buffer memory unit is divided into a plurality of sections called sectors, and each of the sectors is further divided into blocks each consisting of a plurality of words. Upon a read request from the central processing unit, all the information corresponding to every block is transferred from the main memory unit to the buffer memory unit at a time to be stored in the latter. Generally, each sector has a size corresponding to one page of the main memory unit and each block has a size of the order of one-sixteenth to one thirty-second of the sector. The memory control unit includes associative memories respectively provided for each of the sectors for holding therein the addresses of information stored in the corresponding sectors of the buffer memory unit, and means for checking, on the basis of the contents of the associative memories, whether information at the address supplied from the central processing unit exists in the buffer memory unit. Further, the associative memories are divided into a sector part for holding therein the page addresses in the main memory unit of the information stored in the sectors, and a valid-invalid indicator or register part for indicating in what block of the or validity sectors valid information is stored. Accordingly, the more significant bits portion or page address portion of an address signal sent out from the central processing unit, together with a read or write request, is compared with the page addresses held in the sector parts of the associative memories, and when there is a coincidence between the page addresses in one sector, a block valid-invalid or validity element, element representing the less significant bits portion of the address in the sector, is checked. When the valid-invalid or validity element is found valid, the read or write request is directed to the buffer memory unit.

In such a system, an address signal sent out from the central processing unit together with a read or write request is necessarily subject to a sort of checkout functional processing (commonly called association) which includes comparison that may be termed a preprocessing, checking and final detection of the result. The association described above is an important feature of the Gibson approach method. However, from the viewpoint of processing as many data as possible at a higher speed, the association according to the Gibson approach method involves some points which require improvement. Two typical points among then are as follows:

a. Capability of the association to deal with a plurality of memory references issued from the central processing unit.

b. Whether the association has a sufficient response time for the effective execution of the processing in the central processing unit.

However, the association is based on a system for the serial processing of references in spite of the fact that all the memory references are association buffer memory references. Therefore, when a plurality of memory references are collectively requested from the central processing unit, they must be processed serially. This means the need for improvements in the problem a). Further, when a memory reference appears, the steps of sector checking and block checking are required resulting necessarily in consumption of a fixed period of time for the association. Thus, in the Gibson approach method, the tendency toward an equivalent delay in the memory access is unavoidable. This means the necessity for improvements in the problem *b*).

A more practical description will be given hereunder as to the association according to the Gibson approach method. Suppose now that two requests 1 and 2 spaced apart by a time $\Delta t$ are consecutively delivered from the central processing unit to the memory control unit. At first, priority is given to the request 1 and the association for the request 1 is carried out. Suppose that the association time for the request 1 is $t_{a_1}$, then the association is completely occupied by the request 1 during the period of time $$t_w = t_{a_1} - \Delta t.$$

Thus, the association cannot be carried out for the request 2 during the period of time $$t_w = t_{a_1} - \Delta t$$

and the request 2 must wait during that period of time. After the association for the request 1 requiring the association time $t_{a_1}$ has been carried out, the association for the request 2 is started. Simultaneously with the starting of the association for the request 2, reading of data from the buffer memory unit is started on the basis of the request 1. In this step, the association for the request 2 and the data reading upon the request 1 are parallelly carried out. It may thus be considered that the association for a plurality of requests is serially carried out in the priority order even when such requests appear collectively. Accordingly, the prior method is defective in that it cannot process a plurality of requests collectively when such requests are issued from the central processing unit to the memory control unit. As a result, the speed of the system as a whole is inevitably reduced. The prior method is further defective in that the waiting time due to the association time becomes longer as the number of the requests increases, resulting in an equivalent delay in memory access.

The congruence mapping method has been proposed as a mean for improving the latter defect by shortening the association time. According to this method, the page sectors of the main memory unit and the sectors of the buffer memory unit are fixedly arranged to correspond to each other so as to provide for ready comparison between a requested sector and the corresponding sector of the buffer memory unit. This method is advantageous in that the association time can be shortened because any substantial period of time is not especially required for the comparison between individual sectors stored in the associative memory and a requested sector by memory reference. However, the probability of nonexistence in the buffer memory unit of the data coinciding with a request from the central processing unit may be increased and therefore the number of readout of data from the main memory unit and transfer of data to the buffer memory unit will be increased. Thus, the congruence-mapping method is defective in that the speed of the whole system is thereby reduced.

SUMMARY OF THE INVENTION

It is therefore a primary object of the present invention to provide a novel and improved memory control system which is based on the Gibson approach method.

There are two kinds of requests from a central processing unit, that is, an instruction request and an operand request. The data structures of these two requests are entirely different from each other, and the data transmission systems leading to a memory or out of the memory differ from each other too. However, in the prior Gibson approach method, a single inlet and outlet are provided in a memory control unit to deal with both an instruction request and an operand request. Thus, the memory control unit has been unable to process a plurality of requests when such requests are collectively issued from the central processing unit to the memory control unit. It is therefore another object of the present invention to provide a memory control system having such a memory control unit in which at least two inlets and outlets for instruction requests and operand requests are separately provided so as to rapidly process a plurality of requests collectively issued from the central processing unit.

A further object of the present invention is to provide a memory control system having such a memory control unit in which at least two sets of instruction inlets and outlets are provided so as to simultaneously carry out two associations by the two sets of inlets and outlets in response to appearance of instruction requests and two sets of operand inlets and outlets are further provided so as to simultaneously carry out two associations by the two sets of inlets and outlets in response to appearance of operand requests.

The above and other objects, features and advantages of the present invention will be apparent from the following description taken in conjunction with the accompanying drawings.

DESCRIPTION OF THE PREFERRED EMBODIMENT

Figure 1:
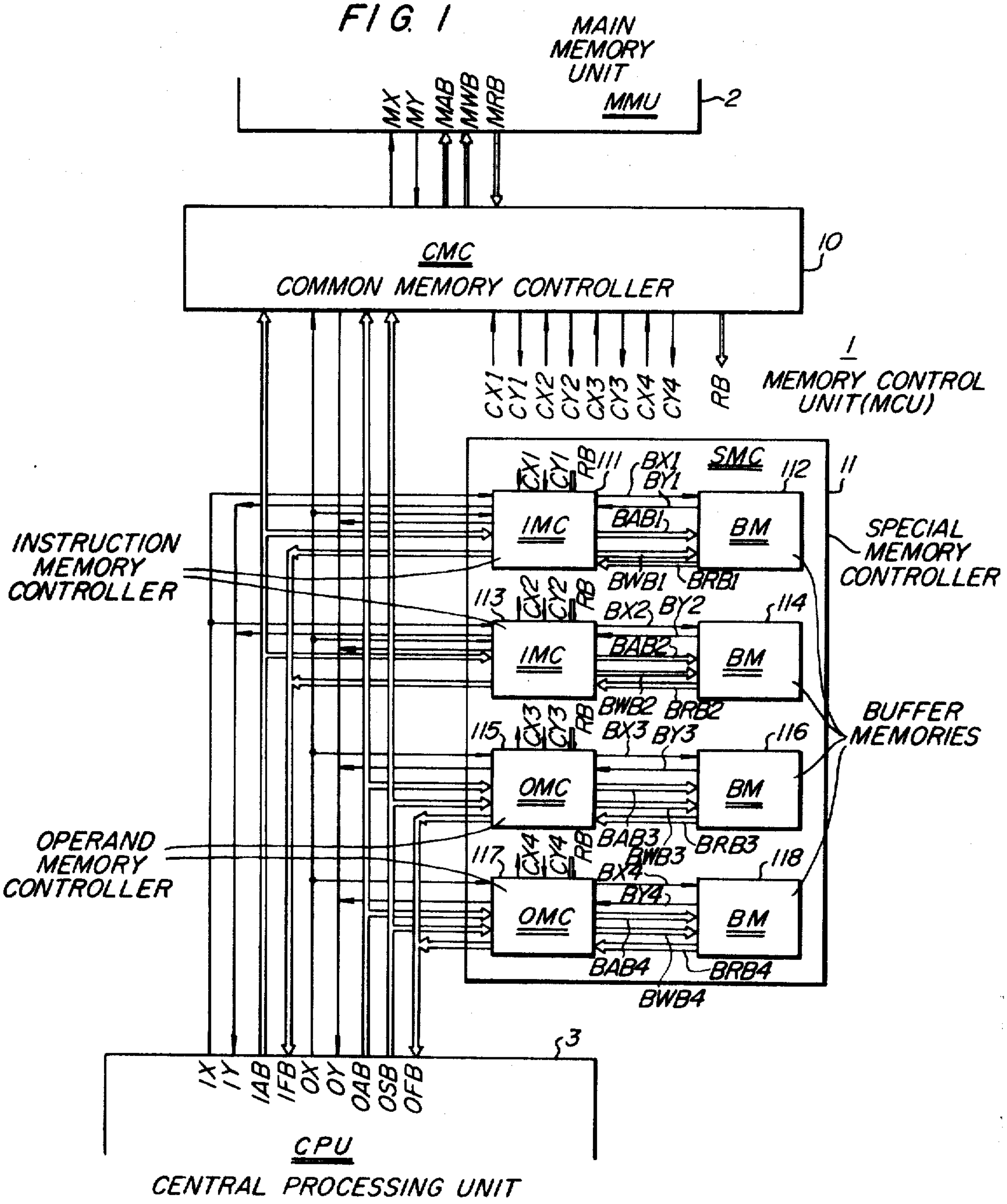
FIG. 1 is a diagrammatic view showing the general structure of a memory control system according to the present invention.

FIG. 1 shows schematically the general structure of a memory control system according to the present invention, but various functions including the maintenance function, multiprocessing function, memory-protecting function and partial writing function are not shown therein.

Referring to FIG. 1, a memory control unit (MCU) 1 is composed of a common memory controller (CMC) 10 and a special memory controller (SMC) 11. The special memory controller 11 includes two instruction memory controllers (IMC1 and IMC2) 111 and 113, two operand memory controllers (OMC1 and OMC2) 115 and 117, and four buffer memories (BM1, BM2, BM3 and BM4) 112, 114, 116 and 118. The reference numerals 2 and 3 denote a main memory unit (MMU) and a central processing unit (CPU) respectively.

An read instruction from the central processing unit 3 is fed by an instruction line IX to the instruction memory controllers 111 and 113. As soon as the instruction line IX is turned on, the central processing unit 3 puts that address on an instruction address bus IAB. When the instruction in address is read out, the instruction memory controller 111 or 113 puts the readout data on an instruction fetch bus IFB and turns on a reply line IY leading to the central processing unit 3.

Similarly, an instruction line OX for the operand read, a reply line OY, an operand address bus OAB, an operand store bus OSB, and an operand fetch bus OFB are provided. The operand store bus OSB serves for the instruction or operand data put out from the central processing unit 3. The instruction line OX serves also for the store instruction, and the reply line OY serves also for the reply thereof. The operation for the operand read is similar to the operation for the instruction read described above.

A two-line instruction line BX1 leads out from the instruction memory controller 111 to the buffer memory 112 for instructing the reading and writing. A corresponding reply line BY1 is provided. There are further provided an address line BAB1 for designating an address in the buffer memory 112, a write data line BWB1 and a read data line BRB1. Similar lines are provided between the instruction memory controller 113 and the buffer memory 114, between the operand memory controller 115 and the buffer memory 116, and between the operand memory controller 117 and the buffer memory 118.

Instruction lines CX1, CX2, CX3 and CX4 extend from the instruction memory controllers 111, 113 and from the operand memory controllers 115, 117 to the common memory controller 10, respectively, and are not turned on when the instruction requested by the central processing unit 3 is met in the buffer memories 112, 114, 116 and 118. Thus, each of these lines consists of two wires pointing out the results of sector check and block check, respectively. Reply lines CY1, CY2, CY3 and CY4 each consisting of two wires extend from the common memory controller 10 to the instruction memory controllers 111, 113 and to the operand memory controllers 115, 117, respectively. These lines are not turned on when the data requested by the central processing unit 3 is met in the buffer memories 112, 114, 116 and 118. The lines CX1, CX2, CX3 and CX4 form pairs with the lines CY1, CY2, CY3 and CY4, respectively. For example, the lines CX4 and CY4 forming a pair operate as follows. Upon finding that the read data requested by the central processing unit 3 does not exist in the buffer memory 118, the operand memory controller 117 acts to turn on the instruction line CX4 leading to the common memory controller 10. When the instruction line CX3 extending from the operand memory controller 115 to the common memory controller 10 is also turned on, the common memory controller 10 starts to read out the operand from the main memory unit 2 by using the address appearing on the operand address bus OAB as it concludes that the operand does not exist in the buffer memories 116 and 118. When the operand is read out, the readout wire of the reply line CY4 is turned on and the data is put on a read bus RB to be supplied to the operand memory controller 117. On the other hand, the common memory controller 10 instructs the operand memory controller 115 to complete the operation by turning on a cancel line (which will be described in detail later) of the reply line CY3. Such an operation is also carried out between the lines CX1 and CY1, CX2 and CY2, and CX3 and CY3.

The common memory controller 10 starts operation in two cases. In the first case, when the central processing unit 3 designates the writing of data through the instruction line OX, the common memory controller 10 picks up the address from the operand address bus OAB and picks up the data from the operand store bus OSB to start the writing operation. Upon picking up the address and data, the common memory controller 10 turns on the reply line of the reply line OY corresponding to the common memory controller 10. The common memory controller 10 turns on the write instruction line of an instruction line MX leading to the main memory unit 2 and sets the address dictated by the operand address bus OAB on a memory address bus MAB while simultaneously setting the data dictated by the operand store bus OSB on a memory write bus MWB. Upon completion of the write-in operation in the main memory unit 2, a reply line MY is turned on and the operation of the common memory controller 10 ceases. In the second case, the common memory controller 10 starts operation by receiving instructions from the instruction memory controllers 111, 113 and from the operand memory controllers 115, 117 through the respective instruction lines CX1, CX2, CX3 and CX4. However, any description as to such operation will not be given herein.

Figures 2A, 2B:
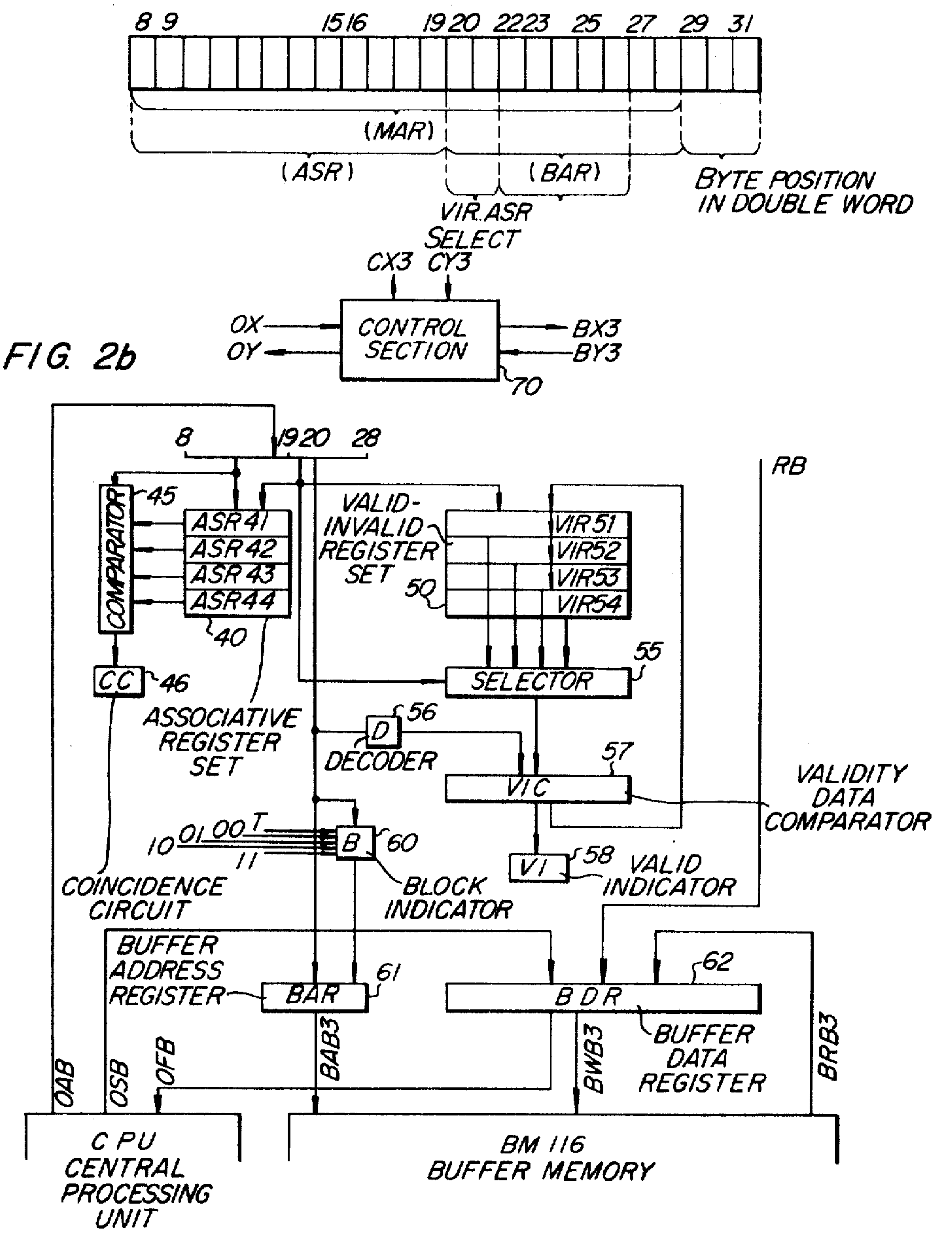
FIG. 2*a* is a diagrammatic illustration of a data structure employed in the present invention.
FIG. 2*b* is a diagrammatic view of an operand controller.

FIG. 2a shows a practical example of an operand address which consists of, for example 24 bits. It is assumed herein that each block includes 32 bytes, each sector includes 1 kilobyte, the buffer memory 116 includes 4 kilobytes, and read data is represented by one double word or 64 bits, as one word in this case consists of 32 bits. Thus, in the data structure shown in FIG. 2a, 3 bits at the bit positions 29, 30 and 31 represent the byte position of one double word, 2 bits at the bit positions 27 and 28 represent the double word position of double words in one block, 5 bits at the bit positions 22 through 26 represent the block position, and 14 bits at the bit, positions 8 through 21 represent the sector position. The sectors are successively divided into groups of four sectors, and the 2 bits at the bit positions 20 and 21 designate the sector position in the four sectors.

In FIG. 2b, for the purpose of an easy understanding of this invention, reference will be made to the association carried out by the congruence-mapping method. However, the normal association as illustrated in the above-referred IBM system 360, Model 85 can also be adapted to this case. Referring to FIG. 2b showing the structure of the operand memory controller 115, it includes an associative register set 40 consisting of associative registers (ASR) 41, 42, 43 and 44, a valid-invalid or validity register set 50 consisting of valid-invalid or validity registers (VIR) 51, 52, 53 and 54, a valid-invalid or validity data comparator (VIC) 57, a valid indicator (VI) 58, a decoder (D) 56, a block indicator (B) 60, a coincidence circuit (CC) 46, a buffer address register (BAR) 61, a buffer data register (BDR) 62, a comparator 45 and a selector 55.

Consider now a case in which a fetch instruction is issued from the central processing unit 3 through the instruction line OX. Upon issuance of the above instruction, the 9 bits at the bit positions 20 through 28 of the operand address shown in FIG. 2a are set in the buffer address register 61 to turn on the read instruction line BX3 leading to the buffer memory 116. On the other hand, the 12 bits at the bit positions 8 through 19 of the operand address are fed to the comparator 45 for comparison with the contents of the associative registers. Comparison with which one of the associative registers 41 to 44 is determined by the 2 bits at the bit positions 20 and 21 of the operand address. The associative register 41 is selected when these two bits are 00. Similarly, the associative registers 42, 43 and 44 are selected when the two bits are 01, 10 and 11, respectively. When a coincidence occurs as a result of comparison in the comparator 45, the coincidence circuit 46 is turned on.

In addition to the function of selection of the associative registers 41, 42, 43 and 44, the two bits at the bit positions 20 and 21 of the operand address are also used for the selection of the valid-invalid or validity registers 51, 52, 53 and 54. The valid-invalid or validity register 51 is selected when the two bits are 00. Similarly, the valid-invalid or validity registers 52, 53 and 54 are selected when these two bits are 01, 10 and 11, respectively. Each of the valid-invalid or validity registers 51 to 54 is arranged to accommodate 32 bits and each bit position indicates the block position in a specific sector. Therefore, when, for example, the two bits at the bit positions 20 and 21 of the operand address are 10 and the five bits at the bit positions 22 through 26 of the operand address are 01010, the valid-invalid or validity register 53 is selected and the less significant bit number 10 of the valid-invalid or validity register 53 is selected. Each of the 32 bits of the valid-invalid or validity registers has a binary signal 1 to 0. When a bit is 1, this means that a block number at the bit position exists, while when the bit is 0, this means that the block required for the buffer memory 116 does not exist.

The two bits at the bit positions 20 and 21 of the operand address are supplied to the selector 55 for selecting one of the valid-invalid or validity registers 51, 52, 53 and 54. The contents of the valid-invalid or validity register thus selected are supplied to the valid-invalid or validity data comparator 57. The selection of the bit position in a bit signal of 32 bits at the comparator is determined by a signal obtained by decoding the five bits at the bit positions 22 through 26 of the operand address by the decoder 56. The comparator 57 discriminates whether the content of the bit position selected by the decoder 56 is 1 or 0. When the result of the discrimination is 1, the requested block has existed in the buffer memory 116 and the valid-invalid or validity indicator 58 is turned on.

A control section 70 decides that a data requested by the central processing unit 3 exists in the buffer memory 116 upon confirming that both the coincidence circuit 46 and the valid-invalid or validity indicator 58 are turned on. The data readout from the main memory unit 2 and supplied to the buffer data register 62 is put on the operand fetch bus OFB, and the reply line OY is turned on. When any one of the coincidence circuit 46 and the valid-invalid or validity indicator 58 is in the off state, block transfer from the main memory unit 2 is commenced to transfer the readout data to the buffer data register 62 through the read bus RB.

The nine bits at the bit positions 20 through 28 of the operand address are set in the buffer address register 61 and designate the address of one double word. When any one of the coincidence circuit 46 and the valid-invalid or validity indicator 58 is in the off state, the two bits at the bit positions 27 and 28 of the operand address are changed to 00, 01, 10 and 11 by the block indicator 60 in order to read out one block consisting of four double words, and these bits are successively set in the less significant two bits of the buffer address register 61 with a timing T. In each of the above cases, the two bits at the bit positions 20 and 21 of the operand address indicate the sector position in the buffer memory 116.

The buffer data register 62 has a number of bits of one double word or 64 bits and is a data register for writing data in the buffer memory 116 and reading out date from the buffer memory 116. The signal line BRB3 transfers data readout from the buffer memory 116 to the buffer data register 62, and the data is fed from the buffer data register 62 to the central processing unit 3 through the operand fetch bus OFB. The operand store bus OSB transfers store data delivered from the central processing unit 3 to the buffer data register 62 to write the data in the buffer memory 116 through the write data line BWB3. As described previously, the read bus RB acts to write data readout from the main memory unit 2 in the buffer memory 116 through the write data line BWB3.

While description has been given in the above with regard to the operand memory controller 115, it will be understood that the instruction memory controllers 111 and 113 and the operand memory controller 117 have a similar structure.

Figures 3, 4:
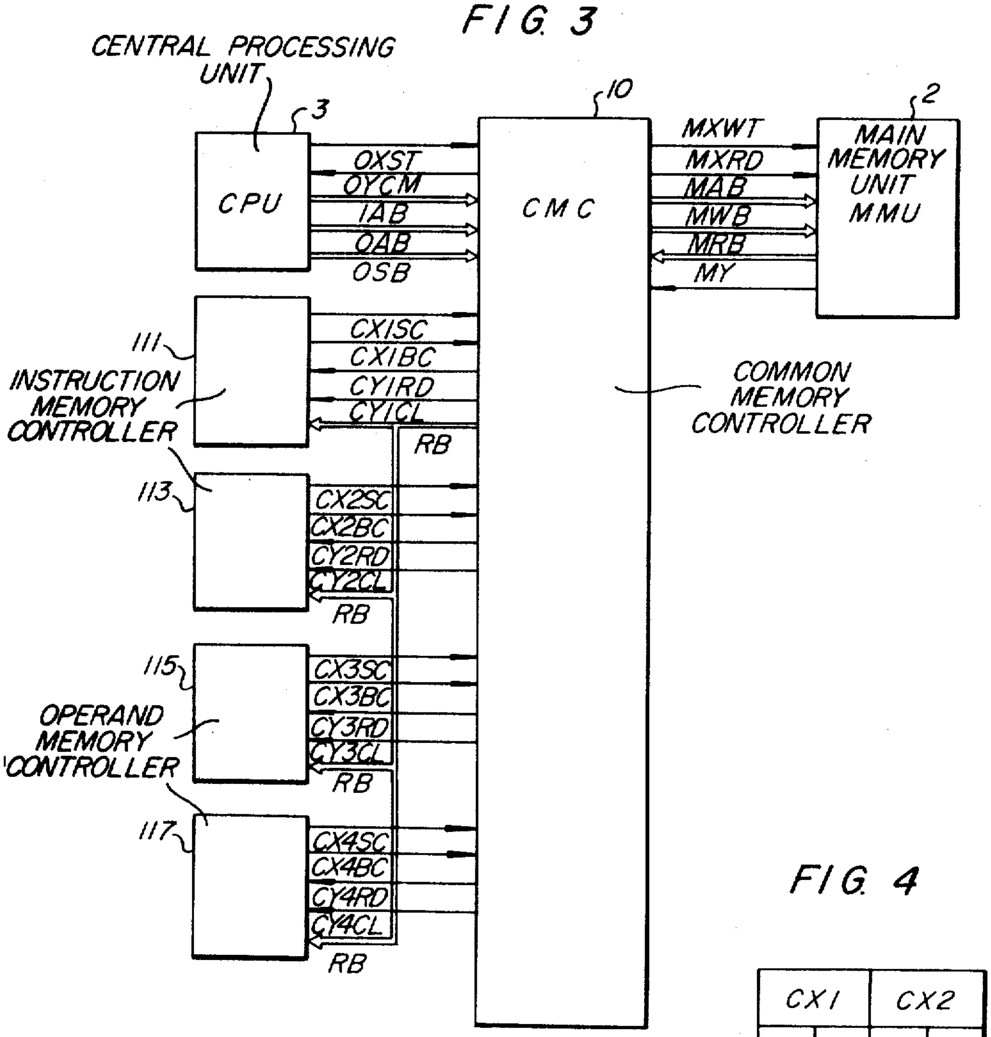
FIG. 3 is a diagrammatic view showing how a common memory controller is interlinked with other elements.
FIG. 4 is a diagrammatic illustration of part of the common memory controller.

FIG. 3 shows how the common memory controller 10 is interlinked with other elements, and a manner of control of individual elements will be described hereunder with reference to FIG. 3.

OXST—This is a control line for an operand store request signal from the central processing unit 3 to the main memory unit 2. This signal is supplied to the instruction memory controllers 111, 113 and to the operand memory controllers 115, 117 simultaneously with the supply to the common memory controller 10 as described previously.

OYCM—This is a reply line corresponding to the control line OXST and turn-on of this line indicates the fact that a data dictated by the operand store bus OSB has been stored at the address dictated by the operand address bus OAB or the data is being stored or has been shifted. Other reply lines against the control line OXST include OYI1, OYI2, OYO3 and OYO4 extending from the instruction memory controllers 111, 113 and from the operand memory controllers 115, 117, respectively. The central processing unit 3 carries out the storing operation upon confirming the fact that these five reply lines have been set.

CX1SC, CX2SC, CX3SC and CX4SC—These lines extend from the instruction memory controllers 111, 113 and from the operand memory controllers 115, 117, respectively, and turn-on of these lines indicates the fact that a fetch request from the central processing unit 3 has failed to find the desired sector in the corresponding buffer memories. The fetch request is fed from the central processing unit 3 to the instruction memory controllers 111 and 113 through a line IX in case of an instruction fetch request IXFC and from the central processing unit 3 operand memory controllers 115 and 117 through a line OX in case of the operand fetch request OXFC. It does not happen that a request is issued from the special memory controller 11 to the common memory controller 10 upon appearance of the store request on the line OXST. In the case of storing, when the desired sector does not exist in the buffer memories, the special memory controller 11 sets the lines OYI1, OYI2, OYO3 and OYO4 thereby ending the operation.

CX1BC, CX2BC, CX3BC and CX4BC—These lines correspond to the lines CX1SC, CX2SC, CX3SC and CX4SC, respectively, and are set when the desired block is not found although the desired sector has been found.

CY1RD, CY2RD, CY3RD and CY4RD—Turn-on of these lines indicates the fact that the common memory controller 10 has started operation upon request by the lines CX1SC, CX1BC, etc. and one double word in one block of the desired sector has been read out. Simultaneously with the above reply, the data is put on the read bus RB. The special memory controller 11 responding to the above reply samples the data to write the data in the buffer memory. In this case, the two bits at the bit positions 27 and 28 and changed to 00, 01, 10 and 11 as one block include four double words.

CY1CL, CY2CL, CY3CL and CY4CL—These are control lines for instructing the canceling of the request issued to the common memory controller 10 by the lines CX1SC, CX1BC, etc. and are operated in the following manner:

a. When the line CX1SC in on and the lines CX2SC and CX2BC are off, this means that a corresponding block has been found in the buffer memory 114. A canceling signal is supplied to the instruction memory controller 111 by the control line CY1CL and the operation is ended.

b. When the line CX1SC is on and the line CX2BC is also on, a canceling signal is supplied to the instruction memory controller 111 by the control line CY1CL, and operation for the block reading for the instruction memory controller 113 is started.

c. When the line CX1SC is on and the line CX2SC is also on, this means that there is no corresponding sector in the buffer memories 112 and 114. Thus, the common memory controller 10 selects one of the buffer memories 112 and 114 and supplies a canceling signal to one of them while starting the block readout service for the other. In this case, an alternate selection system may, for example, by employed for the selection of the buffer memories 112 and 114.

An allowable combination of CX1 and CX2 is shown in FIG. 4. This applies also to CX3 and CX4, and the same result can be obtained by interchanging CX1 and CX2.

Figure 5:
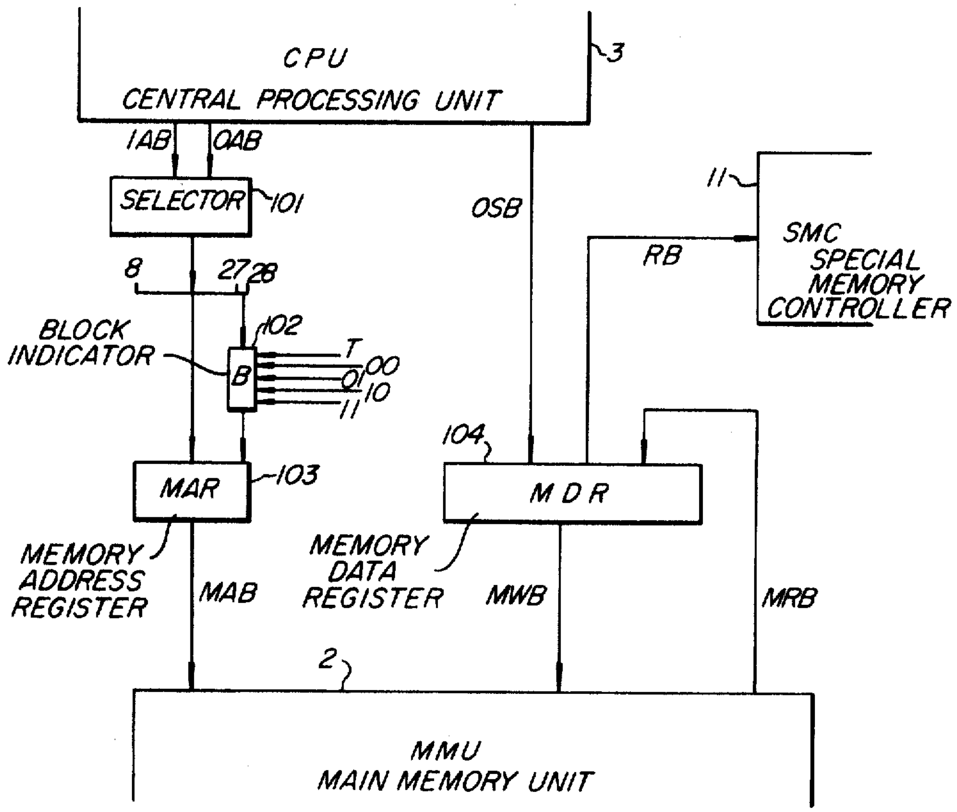
FIG. 5 is a diagrammatic illustration of a data structure of the common memory controller.

FIG. 5 shows the date structure of the common memory controller 10. The common memory controller 10 comprises a selector 101, a block indicator 102, a memory address register (MAR) 103 and a memory data register (MDR) 104. The selector 101 selects the addresses dictated by the instruction address bus IAB and the operand address bus OAB and transfers one of the addresses to the memory address register 103. The operand store bus OSB leading from the central processing unit 3 terminates in the memory data register 104, and a data readout from the main memory unit 2 and supplied through a memory read bus MRB is temporarily stored in the memory data register 104. The data readout from the main memory unit 2 is transferred to the special memory controller 11 through the read bus RB. The block indicator 102 converts the two bits at the bit positions 27 and 28 into 00, 01, 10 and 11 for writing or reading out every one double word in or from the main memory unit 2.

Figure 6:
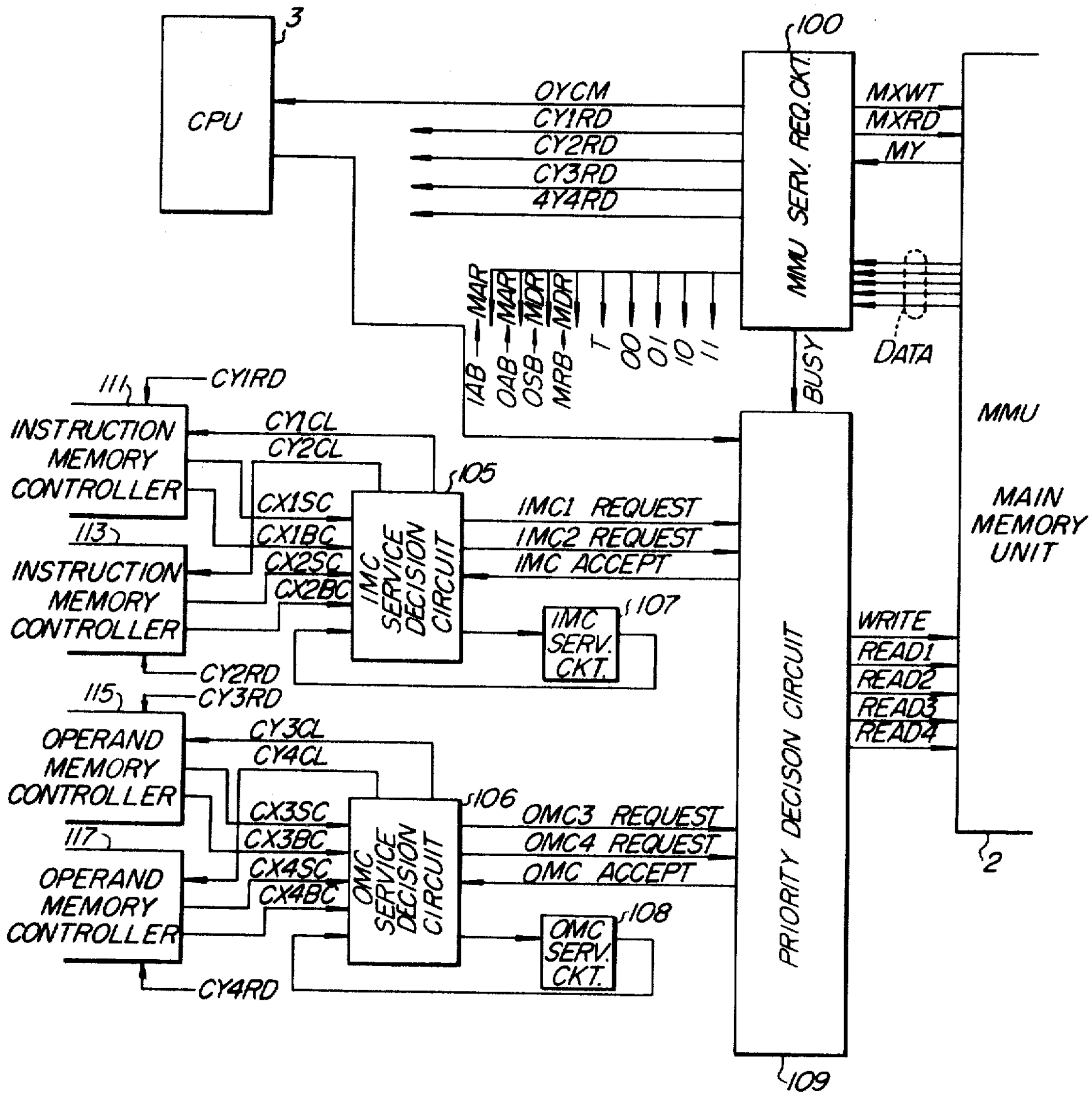
FIG. 6 is a diagrammatic illustration of a control structure of the common memory controller.

FIG. 6 shows a control structure of the common memory controller 10. An IMC service circuit 107 in FIG. 6 is a flip-flop which determines whether either the instruction memory controller 111 or the instruction memory controller 113 is serviced when both the lines CX1SC and CX2SC are turned on as described previously. When the circuit 107 is turned on, the instruction memory controller 113 is serviced and then the flip-flop is reset. When subsequently both the lines CX1SC and CX2SC are simultaneously turned on, the instruction memory controller 111 is serviced and the flip-flop is set in turn. Hereunder, operation of other circuits associated with the IMC service circuit 107 will be described.

Suppose that the lines CX1SC and CX2SC are turned on and the IMC service circuit 107 is in the off state.

a. An IMC service decision circuit 105 sets the line CY2CL and turns on the IMC service circuit 107. The IMC service decision circuit 105 supplies a request via a request line IMC1 REQUEST to a priority decision circuit 109.

b. Three lines, that is, OXST, IMC1 REQUEST or IMC2 REQUEST and OMC1 REQUEST or OMC2 REQUEST can simultaneously be set with respect to the priority decision circuit 109. Priority is in the order of OXST, OMC ½ REQUEST and IMC ½ REQUEST. Therefore, when both the lines OXST and OMC ½ REQUEST are in the off state, the line IMC1 REQUEST is set and a reply appears from the decision circuit 109 via a line IMC ACCEPT. Upon receiving the reply, the IMC service decision circuit 105 ceases operation. The priority decision circuit 109 sets a line READ1 and requests an MMU service request circuit 100 to start block read operation. Upon receiving the above request, the MMU service request circuit 100 sets a line BUSY leading to the priority decision circuit 109. Thus, the priority decision circuit 109 would not accept any request as long as the line BUSY is on.

c. The MMU service decision circuit 100 supplies the instruction address to the data structure through the instruction address bus IAB in response to the READ1 instruction and the contents of the address carried by the instruction address bus IAB are set in the memory address register. Two bits 00 are then supplied through a control line 00 to be set in the less significant bit positions 27 and 28. Subsequently, a line MXRD is set to instruct the main memory unit 2 for reading out the double word in the first position of the block. Generally, the main memory unit 2 is slow in the readout operation and is divided into banks. Thus, the next two bits 01 are set in the bit positions 27 and 28 and the line MXRD is set for the second time to instruct the main memory unit 2 for reading out the next double word. Similarly, readout of the double words corresponding to 10 and 11 is carried out.

d. After the requested data has been read out, the main memory unit 2 sets the line MY. Then, the MMU service request circuit 100 sets the memory read bus MRB leading to the memory data register and subsequently instructs the instruction memory controller 111 through the line CY1RD to write the data carried by the read bus RB in the buffer memory.

e. In this manner, whenever a reply appears on the line MY, the double words corresponding to 00, 01, 10 and 11 are sequentially fed to the instruction memory controller 111. At the completion of this service, the line BUSY is reset to wait for the next service. The same procedure is carried out for the remaining elements. In lieu of the above method of block readout, a method may be employed in which, for example, the designated block of the requested address is 01, readout of the double word corresponding to 01 is carried out at first and the readout is carried out in the order of 00, 10 and 11. According to this method, access to the required words from the central processing unit can be expedited since any period of time for setting the bit positions 27 and 28 at 00 is not required.

Figures 7A, 7B:
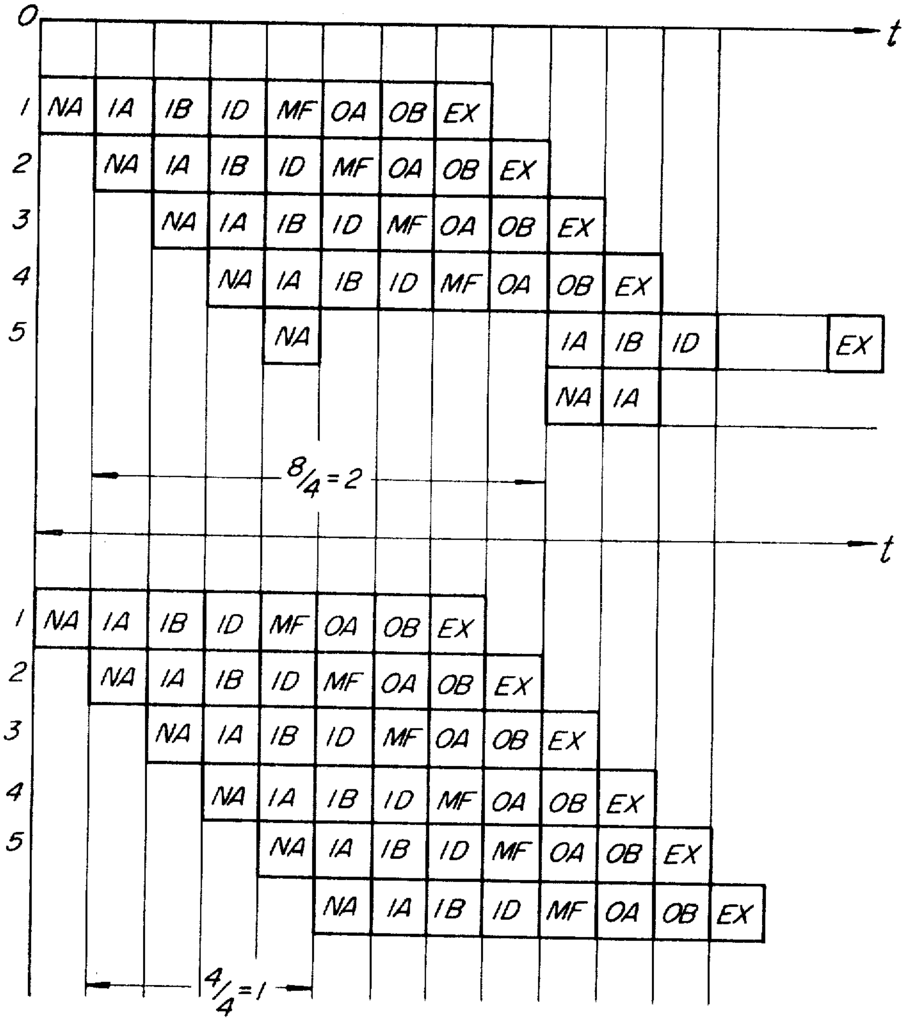
FIG. 7*a* is a diagrammatic illustration of instruction-processing stages in a prior art system.
FIG. 7*b* is a diagrammatic illustration of instruction-processing stages in the system of the present invention.

FIGS. 7*a* and 7*b* diagrammatically show the flow of instruction processing stages in a prior art system and the present invention, respectively. In FIGS. 7*a* and 7*b*, the horizontal axis represents time and the vertical axis represents the number of instructions. The reference characters NA, IA, IB, ID, MF, OA, OB and EX denote the stage for deciding the next instruction address, the stage for doing association for the instruction address, the stage for reading out the instruction from the buffer memory, the stage for decoding the instruction, the modification stage for making, the stage for doing association for the operand address, the stage for reading out the operand from the buffer memory, and the execution stage, respectively. In FIGS. 7*a* and 7*b*, it is assumed that the execution stage is completed in one cycle as in other stages. Advance control is carried out in the instructions, and thus during the execution of the stage IA following the stage NA, the stage NA in the next instruction is being executed.

In the case of the prior art system shown in FIG. 7*a*, execution of the stage NA in the fifth instruction cannot be followed by execution of the stage IA during four cycles because the stage IA overlaps the stage OA in the advance instruction. The stage IA in the fifth instruction cannot be executed until the stage OB in the fourth instruction begins. Accordingly, 8 cycles are required for the execution of four instructions and this means that 2 cycles are required for the execution of one instruction on the average. In contrast, in the case of the present invention shown in FIG. 7*b*, the instruction stages can be continuously executed as shown because the association for instruction request is carried out independently of the association for operand request. Accordingly, 1 cycle only is required for the execution of one instruction on the average, and this means that the instruction can be executed as a speed twice that of the prior art system. Further, in the prior art system, execution of a branch instruction such as a jump requires 5 cycles because the conditions for jump are not fixedly established until execution of the advance instruction is finished. In contrast, in the case of the system according to the present invention, the stage IA may be overlapped with the stage IB to form a single stage and thus execution of a branch instruction requires only 3 cycles.

While a preferred embodiment of the present invention has been described in the above, the present invention is in no way limited to such a specific embodiment and many changes and modifications may be made therein without departing from the spirit of the present invention. In a modification of the present invention, a single buffer memory for instruction and a single buffer memory for operand may be provided in lieu of the two buffer memories for instruction and the two buffer memories for operand. In another modification of the present invention, a plurality of buffer memories may be provided for each of the instructions and operands so as to reduce the probability of nonexistence of the corresponding block in the buffer memories and to increase the processing speed.

I claim:

1. In a data processor having a central processing unit, a main memory unit and a memory controller which is interposed between said central processing unit and said main memory unit to store a portion of information from said main memory unit and simultaneously to exchange information with said central processing unit, said memory controller comprising a memory controller for the exclusive use of instruction information and a memory controller for the exclusive use of operand information.

2. In a data processor having a central processing unit, a main memory unit for storing information at every given number of bits and a memory controller, said central processing unit including at least an operand address bus for exclusively transmitting an operand address, an operand fetch bus for fetching information specified by an operand address transmitted via said operand address bus, an instruction address bus for exclusively transmitting an instruction address, and an instruction fetch bus for fetching information specified by an instruction address transmitted via said instruction address bus, said memory controller comprising a first means which operates associated with said operand address bus and said operand fetch bus and a second means which operates associated with said instruction address bus and said instruction fetch bus, and said first and second means respectively comprising:

a buffer memory means for storing a plurality of information of the given number of bits, a register means for storing an address of information stored in said buffer memory means, search means for searching the existence of an address in said register means which coincides with a corresponding address transmitted via a corresponding address bus of said central processing unit to generate a coincidence signal if there exists a coincident address or to generate an anticoincidence signal if there exists none, means for reading out information specified by the coincident address from said buffer memory means when said search means generates a coincidence signal and transferring the readout information to said central processing unit via a corresponding fetch bus of said central processing unit, and means for reading out from said main memory unit information of the given number of bits which is specified by a part of an address which is transferred to said main memory unit when said search means generates an anticoincidence signal, for storing the readout information in said buffer memory means, for selecting sole information specified by the address out of information of the given number of bits which is read out of said main memory unit, and for transferring the selected information to said central processing unit via a corresponding fetch bus of said central processing unit.

3. In a data processor having a central processing unit, a main memory unit for storing information at every given number of bits and a memory controller, said central processing unit including at least an operand address bus for exclusively transmitting an operand address, an operand fetch bus for fetching information specified by an operand address transmitted via said operand address bus, an instruction address bus for exclusively transmitting an instruction address, and an instruction fetch bus for fetching information specified by an instruction address transmitted via said instruction address bus, said memory controller comprising a first means which operates associated with said operand address bus and said operand fetch bus and a second means which operates associated with said instruction address bus and said instruction fetch bus, and said first and second means respectively comprising:

at least a first and a second buffer memory means for storing a plurality of information of the given number of bits which is read out from said main memory unit, a first and a second register means for storing addresses of information stored in said first and second buffer memory means, respectively, search means for searching the existence of an address in said first and second register means which coincides with a corresponding address transmitted via a corresponding address bus of said central processing unit to generate a coincidence signal if there exists a coincident address in at least one of said first and second register means or to generate an anticoincidence signal if there exists none, means for reading out information specified by the coincident address from a buffer memory means corresponding to a register means containing the coincident address when said search means generates a coincidence signal and transferring the readout information to said central processing unit via a corresponding fetch bus of said central processing unit, and means for reading out from said main memory unit information of the given number of bits which is specified by a part of an address which is transferred to said main memory unit when said search means generates an anticoincidence signal, for storing the readout information in one of said first and second buffer memory means, for selecting sole information specified by the address out of information of the given number of bits which is read out of said main memory unit, and for transferring the selected information to said central processing unit via a corresponding fetch bus of said central processing unit.

4. A data processing system comprising:

a main memory unit;

a central processing unit;

a common memory controller interconnected between said main memory unit and said central processing unit; and a special memory controller interconnected between said common memory controller and said central processing unit, said special memory controller including at least one instruction memory controller and at least one operand memory controller for the exclusive control of instruction and operand data respectively, and wherein each of said instruction and operand memory controllers has a buffer memory associated therewith.

5. A system according to claim 4, wherein each of said instruction memory controllers and operand memory controllers comprises a set of associative registers for receiving a predetermined number of bits corresponding to a portion of address data, a comparator circuit responsive to the contents of each of said associative registers in said set of associative registers for generating an output when the contents of first prescribed bit positions of said registers have first predetermined values; and a coincidence circuit, responsive to the output of said comparator, for generating a coincidence signal, when said predetermined values correspond to second prescribed values of second prescribed bit positions of said address data.

6. A system according to claim 5, wherein each of said memory controllers further includes a set of valid-invalid registers for receiving said predetermined number of bits corresponding to said address data portion;

a selector circuit for receiving the contents of each valid-invalid register in said set of valid-invalid registers and selecting the contents of one of said registers in response to the data contents of said address data portions;

means for decoding a third predetermined number of bits of said address data and for generating a decoded output signal representative thereof; and a validity data comparator, responsive to the output of said selector and said decoding means for generating a valid address indication signal, representative of the selection of a valid address in said buffer memory corresponding to said address data.

7. A system according to claim 6, further comprising a control means, responsive to a first output of said coincidence circuit and said validity data comparator for enabling the transfer of data from said main memory unit over a first data supply line to said central processing unit and for transferring data to a buffer data register associated with said buffer memory from said main memory, when either said coincidence circuit or valid data comparator supplies an output different from said first output thereof.

8. A system according to claim 7, further including a block indicator, responsive to a portion of the contents of said data address and the outputs of said coincidence circuit and said validity data comparator for transferring a prescribed number of bits of said address data in a buffer address register associated with said buffer memory.

9. A system according to claim 2, wherein said common memory controller comprises means for selecting addresses in said instruction address bus and said operand address bus and transferring said addresses to a memory address register, and a block indicator for converting prescribed bits in the data output of said selecting means into predetermined binary indications for accessing said main memory unit.

10. A system according to claim 9 wherein said common memory controller further includes a memory data register interconnected with said central processing unit and said main memory unit for temporarily storing data readout of said main memory unit.

11. A system according to claim 10 wherein said memory controller comprises a control means including service decision circuits respectively associated with each of said first means and second means for determining which of said first means or second means is serviced, a priority decision circuit associated with said service decision circuits and said main memory unit for accessing said main memory unit in response to the outputs of said circuits.

* * * * *